Aug. 25, 1925.
C. H. LAWSON
1,551,493
PEDAL
Filed Dec. 10, 1924
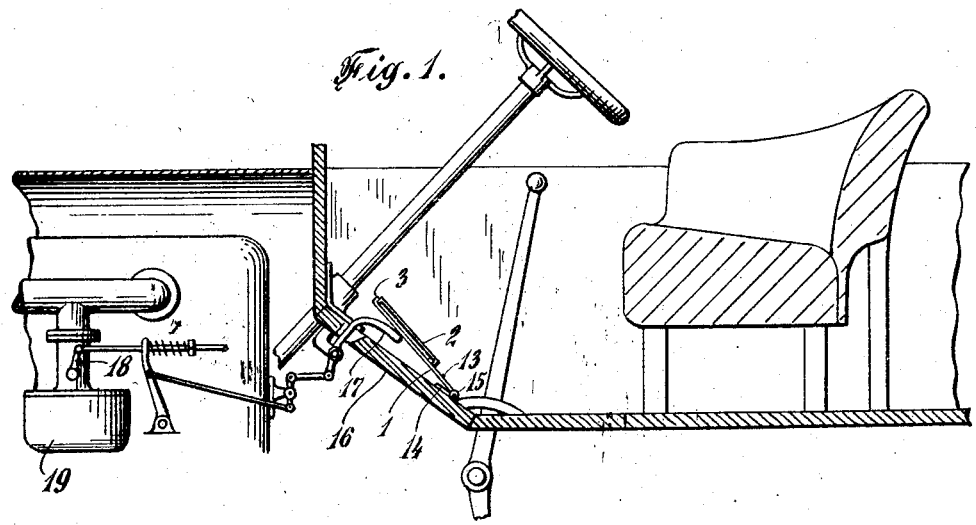
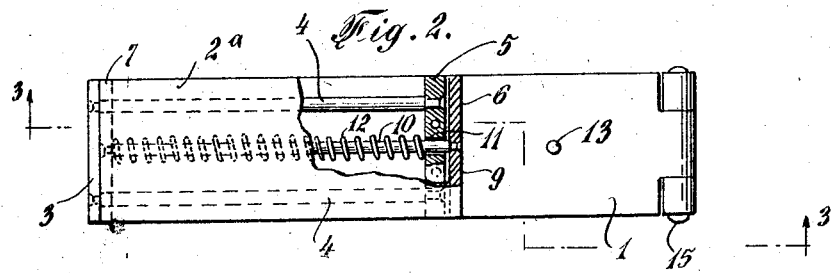
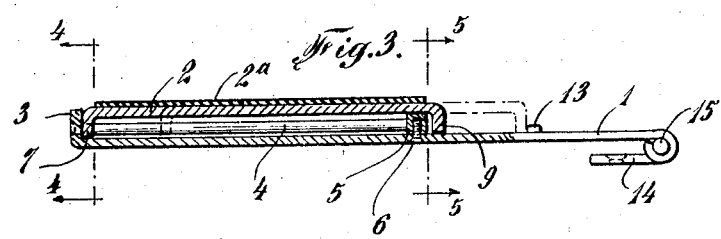
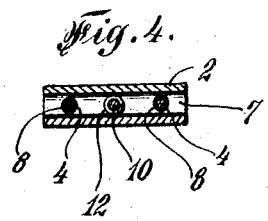
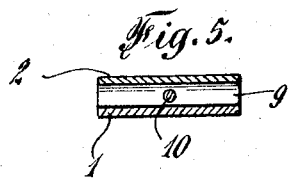
INVENTOR
Carl H. Lawson.
BY
ATTORNEY Patented Aug. 25, 1925.

1,551,493

UNITED STATES PATENT OFFICE.

CARL H. LAWSON, OF NEW YORK, N. Y., ASSIGNOR OF ONE-HALF TO CLARENCE W. WOOD, OF NEW YORK, N. Y.

PEDAL.

Application filed December 10, 1924. Serial No. 754,903.

*To all whom it may concern:*

Be it known that I, CARL H. LAWSON, a subject of the King of Sweden, and resident of New York city, in the county of New York and State of New York, have invented certain new and useful Improvements in Pedals, of which the following is a specification.

My invention relates to improvements in pedals or levers adapted to operate another part, such as the so-called accelerator pedals used in connection with the carburetors of internal combustion engines, and particularly as used on automobiles or motor vehicles.

In carrying out my invention I provide a pedal or lever that is movably supported in position to operate another part, such as an accelerator for a carburetor throttle valve, which pedal is provided with a member movable thereon to be engaged by the foot of the operator in such a manner that when the pedal is operated the member will remain in engagement with the operator's shoe sole or foot and said pedal and member will move relatively one to another, to obviate movement of the shoe sole or foot in contact with the pedal or the part to be actuated.

My invention also comprises novel details of improvement that will be more fully hereinafter set forth and then pointed out in the claims.

Reference is to be had to the accompanying drawings forming a part hereof, wherein Fig. 1 is a sectional view of a portion of an automobile provided with my improvement;

Fig. 2 is a partly broken plan view of my improved pedal;

Fig. 3 is an edge view, partly in section, on line 3, 3, in Fig. 2;

Fig. 4 is a cross section on line 4, 4, in Fig. 3; and

Fig. 5 is a cross section on line 5, 5, in Fig. 3.

Similar numerals of reference indicate corresponding parts in the several views.

My improvement comprises a pedal 1 and a member 2 movably connected together in such a way that the member 2 may slide relatively to the pedal. Means are provided to guide the member 2 upon the pedal for movement relatively thereto. I have illustrated the free end of the pedal as provided with a laterally disposed projection 3 which may be formed by bending the metal of the pedal. Guide rods 4 extend lengthwise between the pedal and member 2, which rods are attached at their outer ends to the projection 3 and at their inner ends said rods are attached to a support or block 5 secured transversely upon pedal 1, as by screws or rivets indicated at 6. One or more of said guide rods may be used. The member 2 is slidably engaged with the rods 4, and is shown provided with a lateral projection 7 having holes 8 to slidably receive said rods, whereby the forward end of member 2 is movably retained relatively to the pedal. The inner or rearward end of member 2 is provided with a projection 9, and a rod 10 is secured to the projections 7 and 9 and passes loosely through a hole 11 in the support or block 5, (Fig. 2), whereby the rod 10 is guided for slidably guiding and retaining the inner or rear end of member 2. A spring 12 is preferably provided to normally push member 2 toward the outer end of the pedal. The spring 12 is shown in the form of a coiled spring located around rod 10 and bearing at one end against projection 7 of member 2 and against the support or block 5 for resiliently pressing the member 2 toward the projection 3, thereby retaining the member in a normal position. The projection 7 may engage the projection 3 as a stop, or the projection 9 may engage the support or block 5 as a stop, to limit the sliding of member 2 toward the free end of the pedal. A pin or stop 13 on the pedal, at a distance from the support or block 5, is in position to be engaged by projection 9 of member 2 to limit the rearward sliding movement of said member relatively to the pedal. The pedal may be pivotally supported at its inner end in any suitable way. I have shown a hinge member 14 attached to the pedal by means of a pivot 15, in the nature of a hinge. By preference I secure upon the outer surface of member 2 a foot piece or pad $2^a$, which may be of rubber, leather or other suitable material having a tendency to cling to the sole of an operator's foot so that the latter will not slip upon the member.

My improved pedal may be attached to a support, as to a foot board 16 of an automobile by securing the hinge member 14 to said support or board in such a position that the free or forward portion of the pedal will normally rest upon a part to be operated, such as an accelerator 17 which may be connected with the throttle valve arm or lever 18 of a carburetor 19, for operating the throttle, in any desired or well known way. The pedal will be maintained in an inclined position respecting the operator's foot, as by means of a spring, (not shown), that operates the accelerator, in a well known way.

When the operator rests his heel upon the foot board and presses his shoe sole against member 2 the latter will remain in engagement with said sole and the pedal 1 will be depressed against the accelerator. Since the pedal moves or advances in the direction of a forward arc around its pivot 15 the member 2 will move or slide rearwardly along the pedal so that the latter will be operated without direct contact of the shoe sole on the pedal and without relative movement between the shoe sole and member 2. When the foot pressure is released the pedal will rise with the accelerator and member 2 will slide forwardly along the pedal, and so on each time the foot is pressed or released, the member 2 moving appropriately along the pedal to accommodate the varied positions of the foot movement. It will be noted that the member 2 is not directly connected with the accelerator or the carburetor throttle but that the movable pedal 1 is interposed between member 2 and the accelerator, and direct engagement of the operator's shoe sole with the pedal and with the accelerator is avoided, whereby the sole of the operator's shoe is kept from sliding engagement with the pedal and the accelerator, with the advantage that wear on the shoe sole is reduced as compared to the direct contact of the shoe sole with an eccelerator on which the shoe sole slides, as has been customary with accelerators. A further advantage is that the operator's foot has a relatively broad member 2 to rest upon as compared to the usual dimension of an accelerator.

My invention is simple and relatively cheap to manufacture, effective in use and not liable to get out of order. My invention is not limited to the details of construction set forth, as the same may be varied, within the scope of the appended claims, without departing from the spirit of my invention.

Having now described my invention what I claim is:

1. A pedal adapted to operate an accelerator and having means to pivotally support it, and a member movably supported on the upper side of the pedal for movement along the latter relatively to the pivot during operation of the pedal, said member being in position to be engaged by a foot.

2. A pedal, adapted to operate an accelerator means to pivotally support the pedal, and a member slidably mounted upon the upper side of the pedal for movement along the latter toward and from the pivot during operation of the pedal, said member being in position to be engaged by a foot.

3. The combination of an accelerator, a pedal operative near one end upon the accelerator, said pedal having guiding means extending along the same substantially in the plane of movement of the pedal, a member on the pedal slidably guided by said means for movement along said plane, said member being in position for a foot to rest thereon, a spring cooperative between the pedal and the member to operate the latter in one direction along the pedal, and stop means for said member to resist the spring and normally retain the member in position to be engaged by a foot.

4. The combination of an accelerator, a pedal operative near one end upon the accelerator, said pedal having means to pivotally support it at the end opposite the accelerator, a member slidably guided upon the upper side of the pedal near the first named end to be engaged by a foot to slide toward and from said pivotal means, a spring normally pressing said member in one direction, and stop means for the member to retain it in position to be operated against the spring.

5. A pedal having a projection near one end and a support spaced from the projection, a guide rod carried by said projection and support, a member slidably guided by said rod, and a spring cooperative with said member to retain the latter in a normal position.

6. A pedal having a guide rod thereon, a member on the pedal guided by said rod, said member having a rod, and guiding means on the pedal for said rod.

7. A pedal having a guide rod thereon, a member on the pedal guided by said rod, said member having a rod, guiding means on the pedal for said rod, and a spring cooperative with said member to retain the latter in a normal position.

CARL H. LAWSON.